United States Patent
Crooijmans et al.

(10) Patent No.: US 8,675,363 B2
(45) Date of Patent: Mar. 18, 2014

(54) THERMAL CONDUCTORS IN ELECTRONIC DEVICES

(75) Inventors: Wilhelmus Crooijmans, San Jose, CA (US); Joshua Een, Hayward, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 225 days.

(21) Appl. No.: 13/191,071

(22) Filed: Jul. 26, 2011

(65) Prior Publication Data

US 2013/0027886 A1  Jan. 31, 2013

(51) Int. Cl.
*H05K 7/20* (2006.01)

(52) U.S. Cl.
USPC ............ 361/704; 361/679.27; 361/679.26; 361/679.47; 361/679.54; 361/719; 435/303.1

(58) Field of Classification Search
USPC ........... 361/679.01, 679.15, 679.21, 679.46, 361/679.54, 688, 689, 698, 700–712, 361/717–727, 732, 737, 752, 690; 165/80.3, 80.4, 80.5, 104.14, 104.21, 165/104.33, 185; 174/15.1, 15.2, 16.3, 252, 174/50, 520; 312/223.2, 223.3, 236; 455/550.1, 575.1, 347, 575.4
See application file for complete search history.

(56) References Cited

U.S. PATENT DOCUMENTS

| | | | | |
|---|---|---|---|---|
| 5,621,613 A * | 4/1997 | Haley et al. | | 361/679.27 |
| 5,732,765 A * | 3/1998 | Drolen et al. | | 165/41 |
| 5,757,615 A * | 5/1998 | Donahoe et al. | | 361/679.47 |
| 5,764,497 A * | 6/1998 | Mizumo | | 361/803 |
| 5,910,883 A * | 6/1999 | Cipolla et al. | | 361/679.27 |
| 6,052,280 A * | 4/2000 | Dilley et al. | | 361/679.54 |
| 6,075,696 A * | 6/2000 | Progl et al. | | 361/679.54 |
| 6,253,836 B1 * | 7/2001 | Mitchell | | 165/86 |
| 6,324,055 B1 * | 11/2001 | Kawabe | | 361/679.54 |
| 6,595,269 B2 * | 7/2003 | Mitchell | | 165/86 |
| 6,601,179 B1 * | 7/2003 | Jackson et al. | | 713/322 |
| 7,068,508 B2 * | 6/2006 | Patel et al. | | 361/699 |
| 7,269,005 B2 * | 9/2007 | Pokharna et al. | | 361/679.48 |
| 7,298,619 B1 * | 11/2007 | Malone et al. | | 361/699 |
| 7,330,354 B2 * | 2/2008 | Watanabe | | 361/705 |
| 7,417,863 B2 * | 8/2008 | Park | | 361/719 |
| 7,537,927 B2 * | 5/2009 | Squirrell et al. | | 435/303.1 |
| 7,701,716 B2 * | 4/2010 | Blanco et al. | | 361/699 |
| 7,888,604 B2 * | 2/2011 | Kawate et al. | | 174/255 |
| 7,969,739 B2 * | 6/2011 | Tsunoda et al. | | 361/704 |
| 8,208,250 B2 * | 6/2012 | Mongia | | 361/679.47 |
| 2005/0180109 A1 * | 8/2005 | Miyazaki et al. | | 361/700 |

(Continued)

FOREIGN PATENT DOCUMENTS

| | | | | | |
|---|---|---|---|---|---|
| JP | 11177264 A | * | 7/1999 | | H05K 7/20 |
| JP | 2006216878 A | * | 8/2006 | | H05K 7/20 |

(Continued)

*Primary Examiner* — Michail V Datskovskiy
(74) *Attorney, Agent, or Firm* — Benjamin M. Searle

(57) ABSTRACT

In one implementation, an electronic device includes a first body portion, a second body portion movably coupled to the first body portion, a heat source, and a thermal conductor in thermal communication with the heat source. The heat source is disposed within one of the first body portion or the second body portion. The thermal conductor has a first end portion, a second end portion, and a flexible portion between the first end portion and the second end portion. The first end portion of the thermal conductor is disposed within the first body portion. The second end portion of the thermal conductor is disposed within the second body portion.

17 Claims, 8 Drawing Sheets

(56) References Cited

U.S. PATENT DOCUMENTS

2005/0243528 A1* 11/2005 Murayama ............... 361/760
2006/0274506 A1* 12/2006 Huang et al. ............. 361/704
2007/0275774 A1* 11/2007 Fagrenius et al. ........ 455/575.4
2009/0207569 A1   8/2009 Tsunoda et al.
2010/0009174 A1   1/2010 Reis

FOREIGN PATENT DOCUMENTS

| JP | 2006253171 A | * | 9/2006 | ............ H05K 7/20 |
| JP | 02006253171 A | * | 9/2006 | ............ H05K 7/20 |
| JP | 02010287672 A | * | 12/2010 | ............ H05K 7/20 |
| JP | 2011022528 A | * | 2/2011 | ............ G09F 9/40 |

* cited by examiner

THERMAL CONDUCTORS IN ELECTRONIC DEVICES

BACKGROUND

Electronic devices include components that generate thermal energy or heat. For example, cellular telephones, smartphones, tablet devices, slate devices, personal digital assistants (PDAs), and laptops include processors, power amplifiers, voltage converters, current drivers, and other components that generate heat. Such electronic devices can be sensitive to the heat generated or radiated at these components.

Thermal management of such electronic devices includes techniques and methodologies employed to manage (e.g., limit and dissipate) the heat generated by these components to prevent malfunction of the electronic devices. For example, heat sinks, heat pipes, and other structures can be coupled to the electronic devices or the components included within these electronic devices to dissipate the heat generated at these components.

DETAILED DESCRIPTION

Reduction of the size of electronic (or other) devices often complicates thermal management of these devices. For example, as the size of electronic devices such as cellular telephones, smartphones, tablet devices, slate devices, PDAs, and laptops is reduced, there is less space within these devices for natural heat dissipation (e.g., radiation and convection) and thermal management of the devices and their components. As a specific example, traditional heat sinks and heat pipes can be too large for (e.g., do not fit within) many electronic devices.

As a result of the thermal management limitations of some electronic devices, some electronic device manufacturers configure these electronic devices with lower powered components, under-provision the components (e.g., configure the components to operate at lower voltage, speed, or power than those at which the components are capable of operating), or use expensive components that generate less heat during operation to reduce the need for thermal management. Such measures often increase the price and/or decrease the performance of the electronic devices.

Implementations discussed herein include devices having flexible thermal conductors for thermal management. More specifically, for example, implementations discussed herein include electronic devices having two body portions movably coupled one to another. A flexible thermal conductor is coupled to a heat source such as a processor, a power amplifier, or other component that generates or radiates heat within one of the body portions. The flexible thermal conductor extends from that body portion to the other body portion. Thus, heat (or thermal energy) generated at the component to which the thermal conductor is coupled can be conducted to and/or dissipated at the other or both body portions.

As used herein, the singular forms "a," "an," and "the" include plural referents unless the context clearly dictates otherwise. Thus, for example, the term "flexible thermal conductor" is intended to mean one or more flexible thermal conductors or a combination of flexible thermal conductors.

Figure 1A:
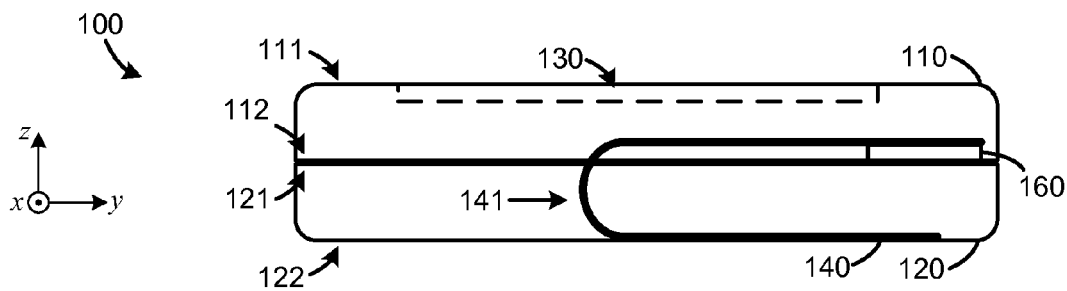
FIGS. 1A-1E are perspective views of an electronic device including a flexible thermal conductor, according to an implementation.
Figure 1B:
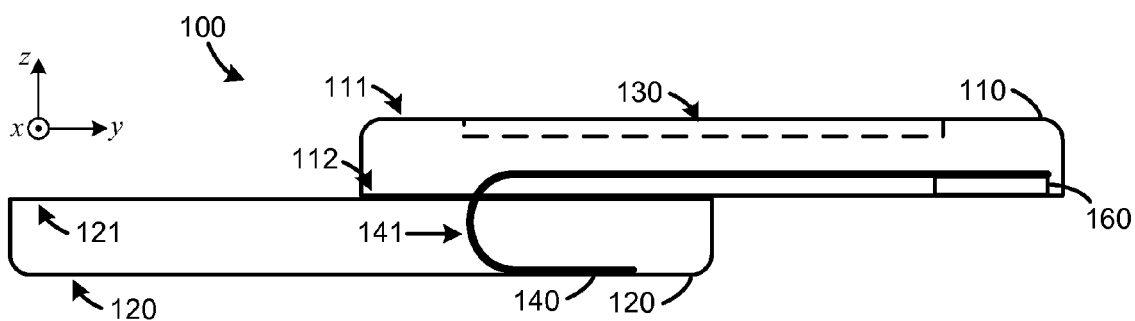

FIGS. 1A-1F are perspective views of an electronic device including a flexible thermal conductor, according to an implementation. Electronic device 100 includes body portion 110, body portion 120, face 111, face 112, face 121, face 122, display 130, flexible thermal conductor 140, ports 151 and 152, input device 153, and heat source 160. Body portions 110 and 120 are movably coupled one to another. That is, body portions 110 and 120 are coupled one to another such that body portions 110 and 120 are movable with respect to one another. FIG. 1A is a side perspective view of electronic device 100 in a closed configuration. That is, face 112 of body portion 110 is substantially aligned with or adjacent to face 121 of body portion 120. FIG. 1B is a side perspective view of electronic device 100 in an extended (or open) configuration. As illustrated in FIG. 1B, one portion of face 112 of body portion 110 is substantially aligned with or adjacent to face 121 of body portion 120, and another portion of face 112 is not aligned with or adjacent to face 121.

More specifically, in the example illustrated in FIGS. 1A and 1B, body portions 110 and 120 are slidably coupled one to another. Accordingly, electronic device 100 can be converted or moved from the closed configuration to the extended configuration by sliding body portion 110 relative to body portion 120. For example, body portions 110 and 120 can each include members or couplers (not illustrated) that allow body portions 110 and 120 to move relative one to another along the y-axis between the closed configuration and extended configuration, but restrict movement of body portions 110 and 120 relative one to another in along the x-axis and the z-axis. As a specific example, electronic device 100 can be a slider phone or a PDA, tablet device, or slate device with, for example, a slide-out keyboard. Furthermore, as body portions 110 and 120 move or slide relative one to another, flexible portion 141 of flexible thermal conductor 140 flexes or, here, rolls to allow movement of body portion 110 and 120 without separation or breakage of flexible thermal conductor 140.

Figure 1C:
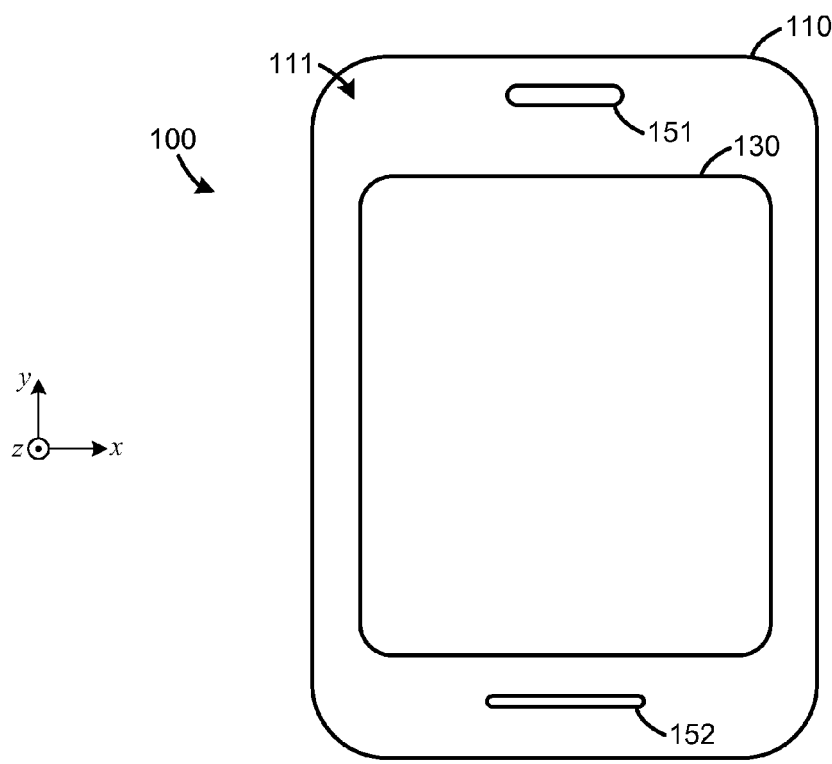

FIG. 1C is a front perspective view of electronic device 100 in the closed configuration illustrated in FIG. 1A. Port 151 illustrated in FIG. 1C is an opening within body portion 110. For example, port 151 can be an opening for a speaker disposed within body portion 110. Similarly, port 152 is an opening within body portion 110. As a specific example, port 52 can be an opening for a microphone within body portion 110.

Figure 1D:
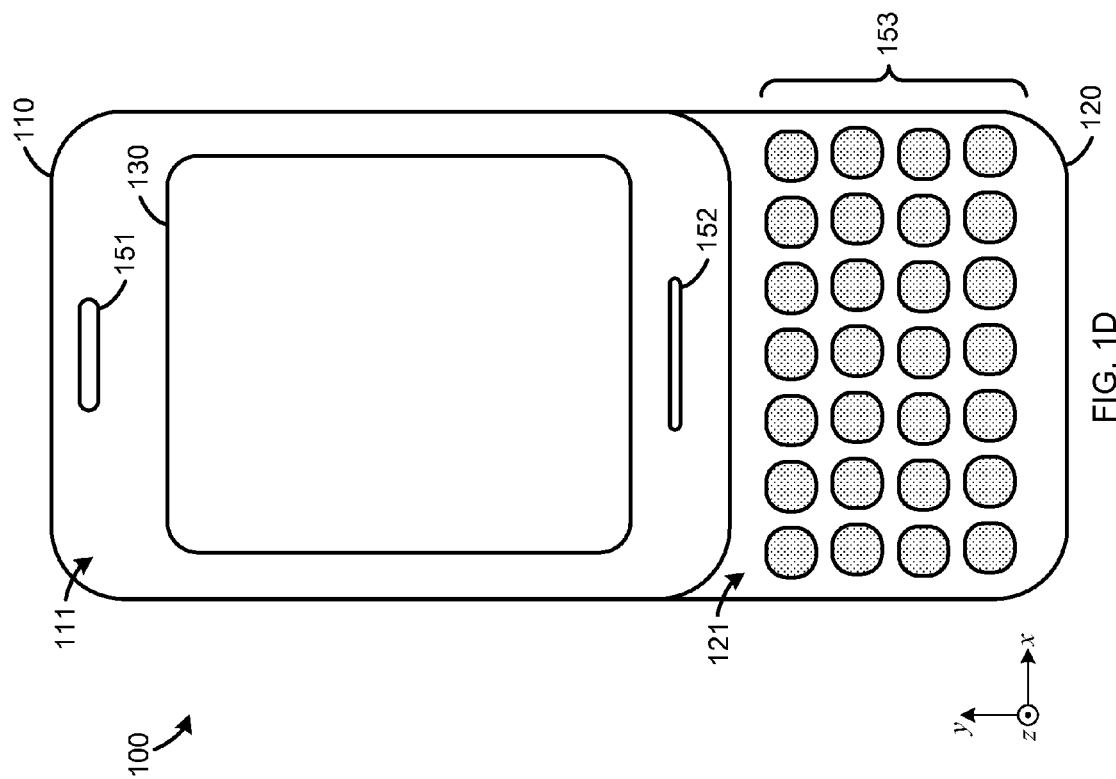
Figure 1E:
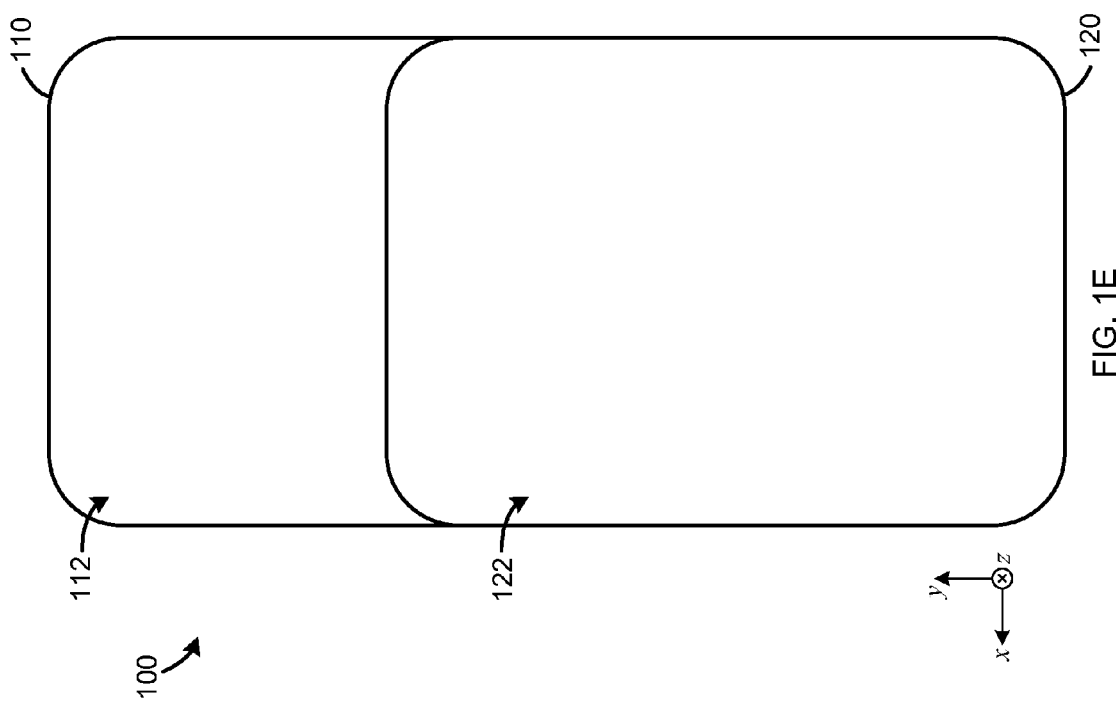

FIG. 1D is a front perspective view of electronic device 100 in the extended configuration illustrated in FIG. 1B. As illustrated in FIG. 1D, input device 153 is accessible in the extended configuration. The input device illustrated in FIG. 1D is a keyboard. In other implementations, an electronic device can include other or additional input devices. As specific example, an input device can be a button, a microphone, a multi-axis control (e.g., a joystick), a touch- or proximity-sensitive area, or other input device. Furthermore, in some implementations, an input device can be accessible in the closed configuration. For example, display 130 can be or include an input device such as a touch-sensitive layer, and can be accessible in the closed configuration as illustrated in FIG. 1C. FIG. 1E is a back perspective view of electronic device 100 in the extended configuration illustrated in FIG. 1B.

As illustrated in FIGS. 1A and 1B, flexible thermal conductor 140 includes flexible portion (or section) 141 and extends between body portions 110 and 120. More specifically, flexible thermal conductor 140 is in thermal communication with heat source 160 within body portion 110, and extends to body portion 120. For example, flexible thermal conductor 140 can be coupled to heat source 160 such that thermal energy or heat can be conducted or transferred from heat source 160 to flexible thermal conductor 140 via thermal conduction to body portion 120. As a specific example, flexible thermal conductor 140 can be mechanically coupled or connected to heat source 160 or can be coupled to heat source 160 with an thermally conductive adhesive such as an epoxy. In some implementations, a thermally conductive paste or other material can be disposed between heat source 160 and flexible thermal conductor 140 to improve thermal conduction or thermal communication between heat source 160 and flexible thermal conductor 140.

Furthermore, in some implementations, flexible thermal conductor 140 is in thermal communication with a thermally conductive member or structure (not shown) within or coupled to body portion 120 to further dissipate thermal energy. For example, flexible thermal conductor 140 can be coupled to a heat sink and/or heat pipe at body portion 120.

Heat source 160 is a component or group of components within electronic device 100 that generates heat. For example, heat source 160 can be a processor package (e.g., an integrated circuit implementing a general purpose, application-specific, graphics, or other processor enclosed within a protective housing or packaging), a power amplifier package such as a radio-frequency power amplifier package, a voltage convertor package, a current driver package, or other component package (e.g., component within a housing) of electronic device 110. In some implementations, heat source 160 can be removable or separable from electronic device 100. For example, heat source 160 can be a removable battery of electronic device 100. In some implementations, heat source 160 can receive thermal energy from an external source. For example, heat source 160 can be a mirror used to reflect optical energy (e.g., light) or a lens used to focus optical energy at which heat is generated in response to reflecting or focusing the optical energy. Flexible thermal conductor 140 can be in thermal communication with or coupled to the mirror to dissipate the heat.

As illustrated in FIGS. 1A and 1B, flexible thermal conductor 140 extends between body portion 110 and 120 in the closed configuration and the extended configuration. Thus, heat can be conducted or dissipated from heat source 160 when electronic device 100 is in the closed configuration and the extended configuration.

FIGS. 2A-2H are perspective views of flexible thermal conductors, according to various implementations. A flexible thermal conductor is a structure or component that includes a material or materials that conduct thermal energy and at least one flexible portion. A flexible portion of a thermal conductor is a unitary or monolithic portion or section of the thermal conductor that can flex repeatedly without breaking over the usable life of a device such as an electronic device. Said differently, a flexible thermal conductor is a thermal conductor (e.g., a structure including a material or materials along which heat can be conducted, transferred, or dissipated) that can be repeatedly flexed (e.g., bent or rolled) about a unitary section of the thermal conductor.

Figure 2A:
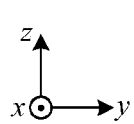
FIGS. 2A-2H are perspective views of flexible thermal conductors, according to various implementations.
Figure 2A:
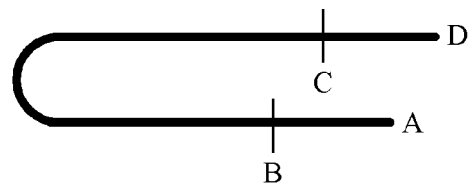
Figure 2B:
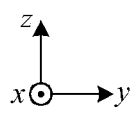
Figure 2B:
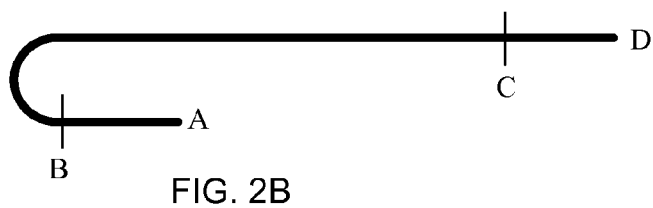
Figure 2C:
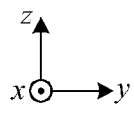
Figure 2C:
Figure 2D:
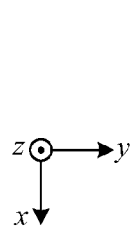
Figure 2D:
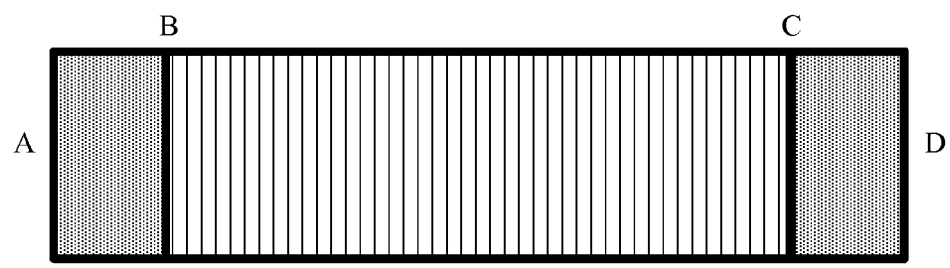

FIG. 2A illustrates a side perspective view of a flexible thermal conductor in a first flexed configuration corresponding to flexible thermal conductor 140 in the closed configuration of electronic device 100 illustrated in FIG. 1A. FIG. 2B illustrates a side perspective view of a flexible thermal conductor in a second flexed configuration corresponding to flexible thermal conductor 140 in the extended configuration of electronic device 100 illustrated in FIG. 1B. FIG. 2C is a side perspective view of a flexible thermal conductor in an unflexed (or straightened) configuration. FIG. 2D is a top perspective view of a flexible thermal conductor in an unflexed configuration. The flexible thermal conductor illustrated in FIGS. 2A-2D is labeled with reference markers A, B, C, and D. Reference marker A is at a first end portion of the flexible thermal conductor, and reference marker D is at a second end portion of flexible thermal conductor. Reference markers B and C are at first and second middle portions, respectively, of the flexible thermal conductor.

In some implementations, the flexible thermal conductor is a substantially monolithic, unitary, and/or uniform thermal conductor that is flexible from A to D. That is, the flexible thermal conductor is flexible along its entirety. In other implementations, some portions of the flexible thermal conductor are flexible and other portions of the flexible thermal conductor are not flexible. As an example, the flexible thermal conductor can be flexible at a portion defined between B and C, not flexible at a portion defined between A and B, and not flexible at a portion defined between C and D.

Furthermore, the flexible thermal conductor can have a substantially uniform composition from A to D, or can have a composition that varies from A to B. As a specific example, the flexible thermal conductor can have a first composition (e.g., be made from a first material or first group of materials) from A to B, a second composition from B to C, and a third composition from C to D. Moreover, the flexible thermal conductor can vary in thickness (or height) and/or width from A to D. As a specific example illustrated in FIG. 2D, the flexible thermal conductor can be scored to, for example, improve the flexing characteristics of the flexible thermal conductor.

Figure 2E:
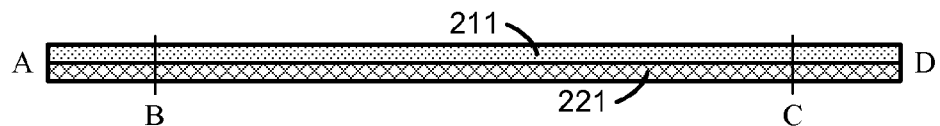
Figure 2F:
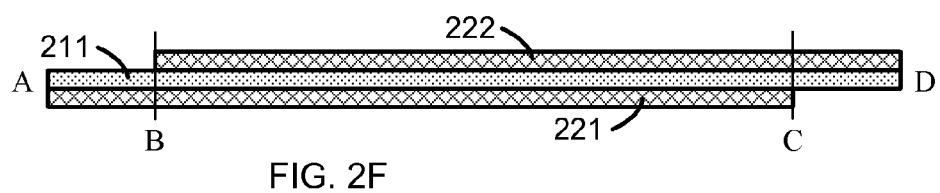
Figure 2G:
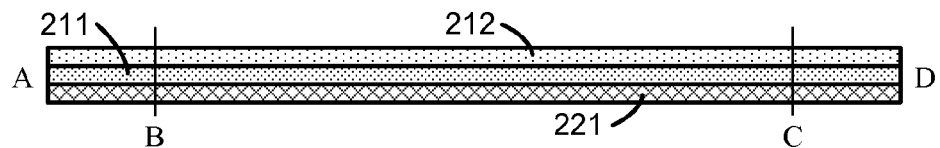

Moreover, as illustrated in FIGS. 2E-2G, a flexible thermal conductor can include multiple layers to, for example, improve flexing and/or thermal conduction properties or attributes of the flexible thermal conductor. Additionally, the flexible thermal conductor can include layers to improve durability of or to protect the flexible thermal conductor. Moreover, some layers of the flexible thermal conductor can be thermally insulating. Furthermore, the layers can be separate one from another, coupled one to another using, for example, a thermally conductive adhesive, or can be intertwined (e.g., woven or braided together).

FIG. 2E illustrates a side perspective view of a flexible thermal conductor including two layers: layer 211 and layer 221. For example, the flexible thermal conductor can be graphite film including a plastic layer (e.g., layer 221) and a graphite layer (e.g., layer 211). FIG. 2F illustrates a side perspective view of a flexible thermal conductor including three layers: layer 211, layer 221, and layer 222. As illustrated in FIG. 2F, layer 211 is disposed between layers 221 and 222, and is exposed at each of end portion A and end portion D. As an example, the flexible thermal conductor can be a graphite film including a graphite layer (e.g., layer 211) between two plastic layers (e.g., layers 221 and 222). FIG. 2G illustrates a side perspective view of another flexible thermal conductor including three layers: layers 211, 212, and 221. For example, the flexible thermal conductor can include a plastic layer (e.g., layer 221), a graphite layer (e.g., layer 211), and a copper layer (e.g., layer 212).

Figure 2H:
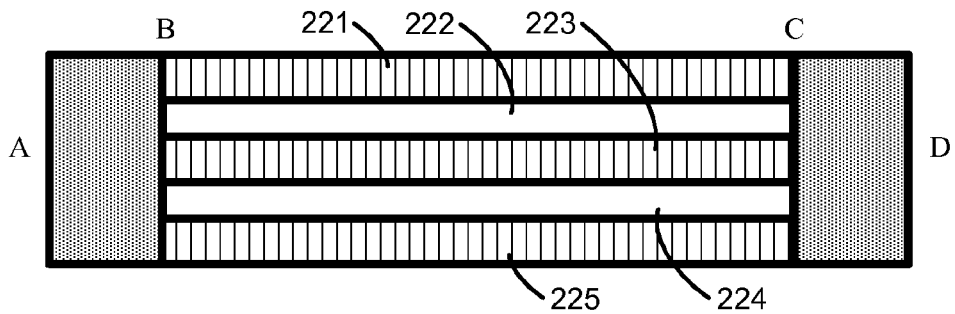

FIG. 2H is a top perspective view of a flexible thermal conductor that defines a group of thermal paths. A thermal path is a path along which thermal energy can be conducted at a thermal conductor. As illustrated in FIG. 2H, sections have been removed from the flexible thermal conductor to define openings 222 and 224. Flexible thermal conductor thus defines three thermal paths: thermal path 221, thermal path 223, and thermal path 225. In other words, there are three paths—221, 223, and 225—between the portion defined between A and B and the portion defined between C and D along which heat can be conducted along the flexible thermal conductor between B and C.

In some implementations, openings 222 and 224 can be useful to dispose the flexible thermal conductor within an electronic device that includes other cables (e.g., wires or ribbon cables) and/or components. For example, other cables that would otherwise interfere or come into contact with the flexible thermal conductor can be positioned within the electronic device or routed such that these cables pass through openings 222 and 224. Thus, the flexible thermal conductor with multiple thermal paths can be used within electronic devices that are crowded with other cables and/or components.

Figure 3A:
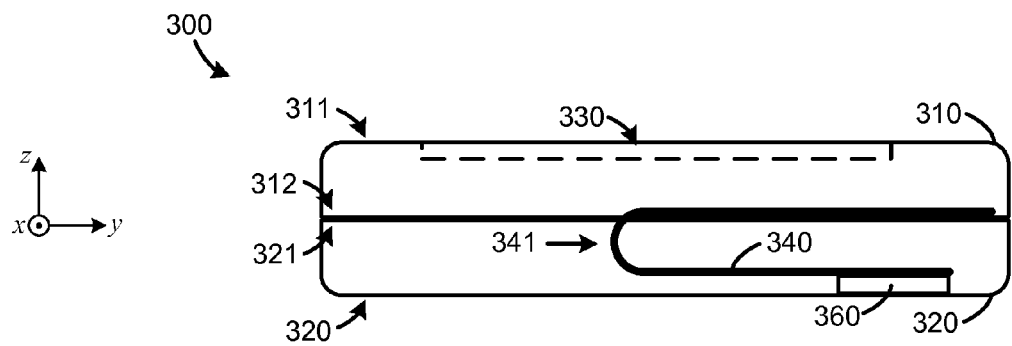
FIGS. 3A and 3B are side perspective views of an electronic device including a flexible thermal conductor, according to an implementation.
Figure 3B:
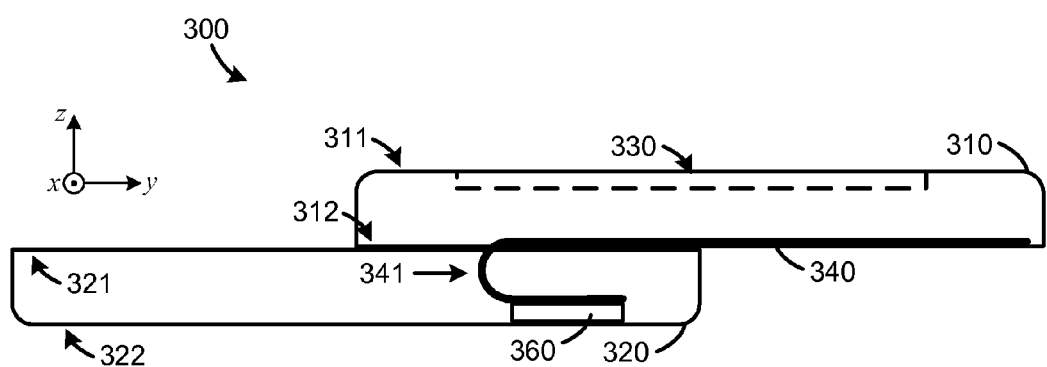

FIGS. 3A and 3B are side perspective views of an electronic device including a flexible thermal conductor, according to an implementation. Electronic device 300 includes body portion 310, body portion 320, face 311, face 312, face 321, face 322, display 330, flexible thermal conductor 340 having flexible portion 341, and heat source 360. FIG. 3A is a side perspective view of electronic device 300 in a closed configuration. That is, face 312 of body portion 310 is substantially aligned with or adjacent to face 321 of body portion 320. FIG. 3B is a side perspective view of electronic device 300 in an extended (or open) configuration. As illustrated in FIG. 3B, one portion of face 312 of body portion 310 is substantially aligned with or adjacent to face 321 of body portion 320, and another portion of face 312 is not aligned with or adjacent to face 321.

Similar to electronic device 100 illustrated in FIGS. 1A-1E, flexible thermal conductor 340 dissipates heat generated at heat source 360 from one body portion of electronic device 300 to another body portion of electronic device 300. More specifically, flexible thermal conductor 340 is in thermal communication with heat source 360, and conducts heat away from heat source 360 toward body portion 310.

As illustrated in FIGS. 3A and 3B, heat source 360 is disposed within body portion 320, and display 330 is disposed within body portion 310. That is, heat source 360 is disposed within a body portion of other than the body portion of electronic device 300 that includes display 330. In contrast, referring to FIGS. 1A and 1B, heat source 160 of electronic device 100 is disposed within the body portion of electronic device 100 that include display 130. Thus, a heat sources can be disposed within various body portions of electronic devices, and flexible thermal conductors can conduct or dissipate heat generated at those heat sources to other body portions of the electronic devices.

Figure 4A:
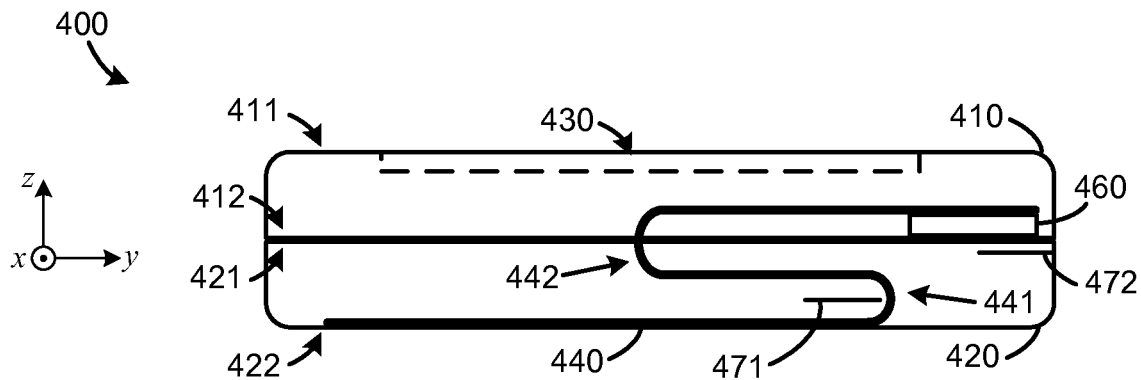
FIGS. 4A-4D are perspective views of an electronic device including a flexible thermal conductor and guide members, according to an implementation.
Figure 4B:
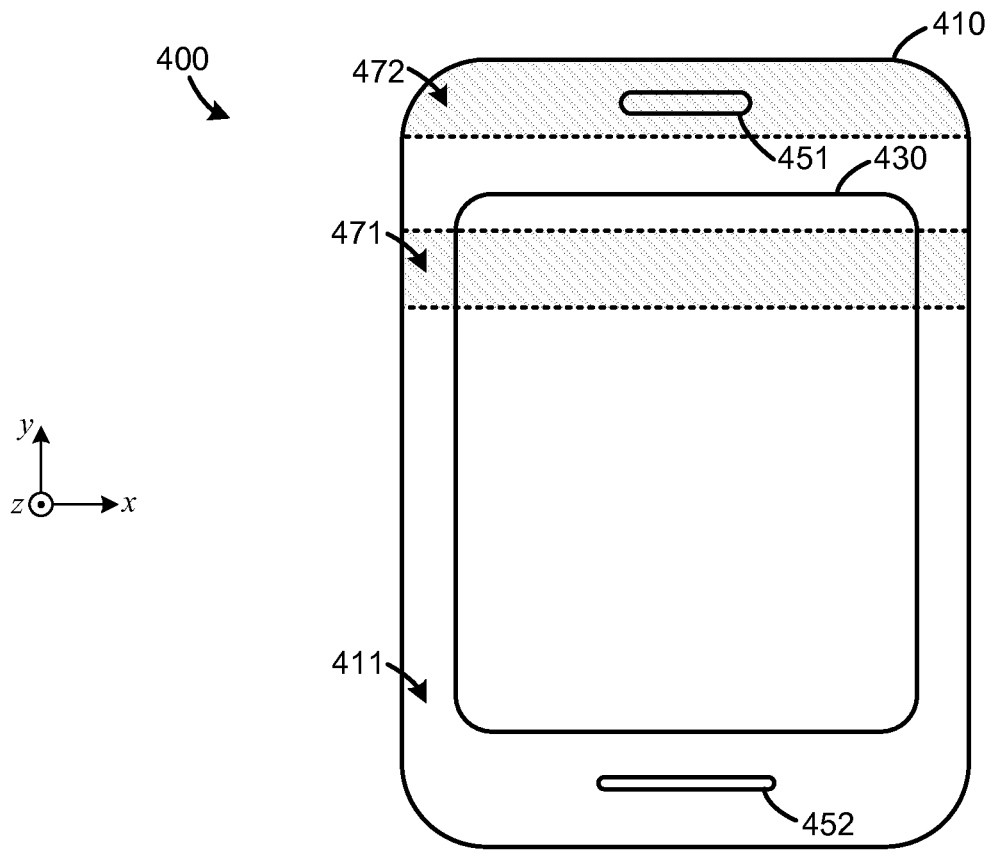
Figure 4C:
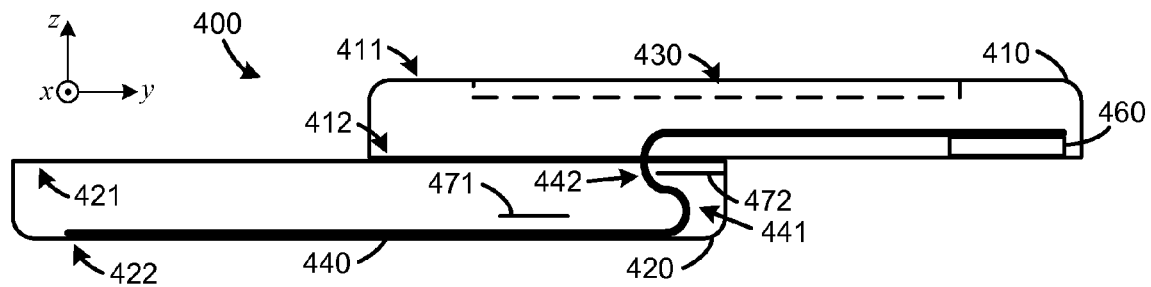
Figure 4D:
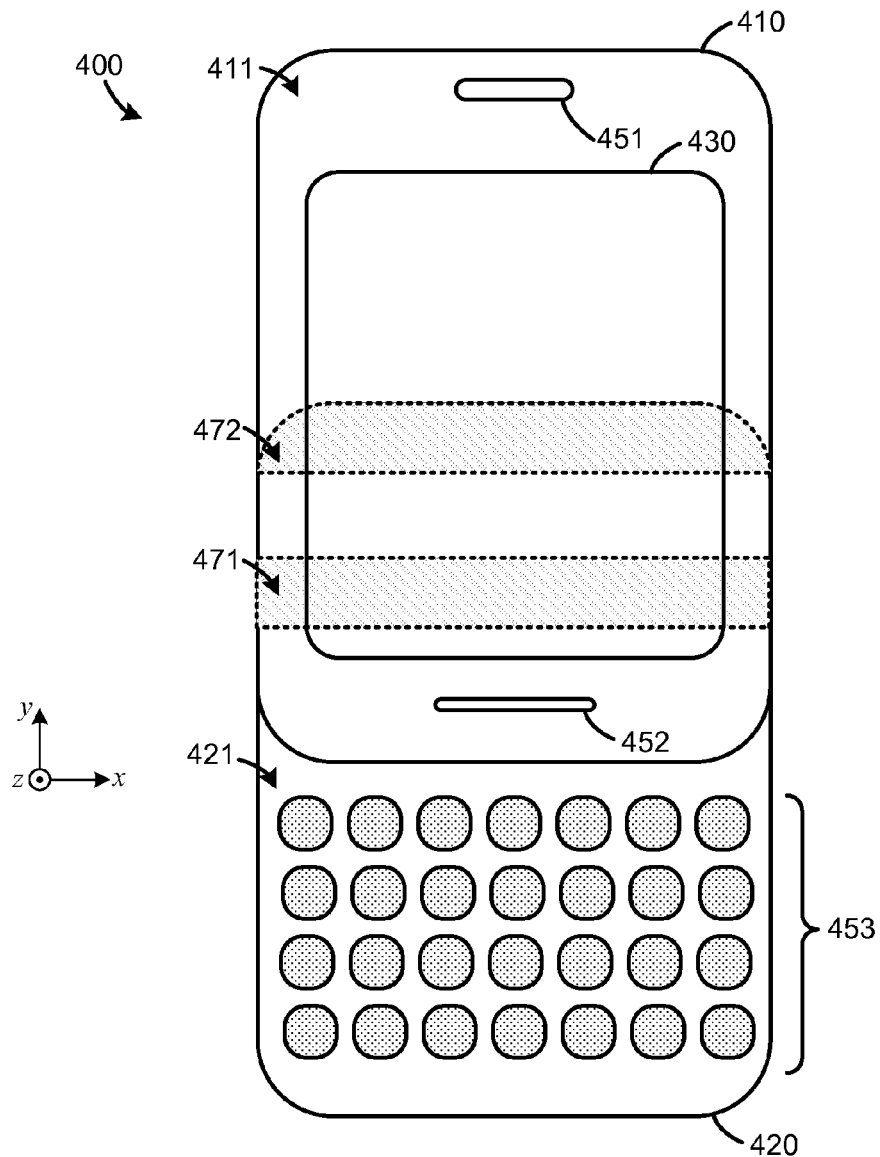

FIGS. 4A-4D are perspective views of an electronic device including a flexible thermal conductor and guide members, according to an implementation. Electronic device 400 includes body portion 410, body portion 420, face 411, face 412, face 421, face 422, display 430, flexible thermal conductor 440, ports 451 and 452, input device 453, heat source 460, and guide members 471 and 472. FIG. 4A is a side perspective view of electronic device 400 in a closed configuration. That is, face 412 of body portion 410 is substantially aligned with or adjacent to face 421 of body portion 420. FIG. 4C is a side perspective view of electronic device 400 in an extended (or open) configuration. As illustrated in FIG. 4C, one portion of face 412 of body portion 410 is substantially aligned with or adjacent to face 421 of body portion 420, and another portion of face 412 is not aligned with or adjacent to face 421. FIGS. 4B and 4D illustrate front perspective views of electronic device 400 in the closed configuration and extended configuration, respectively. Guide members 471 and 472 are illustrated within electronic device 400.

In the example illustrated in FIGS. 4A and 4C, flexible thermal conductor 440 is disposed within body portion 420 to have bends 441 and 442 about which flexible thermal conductor 440 can flex, rotate, or move to allow electronic device 400 to move between the closed configuration and the extended configuration. Guide members 471 and 472 are protrusions, baffles, or other structures of body portion 420 that are positioned relative to flexible thermal conductor 440 (or bends 441 and 442 of flexible thermal conductor 440) to prevent straightening of flexible thermal conductor 440. That can be useful, for example, to prevent flexible thermal conductor 440 from moving to a configuration that binds or inhibits movement of body portions 410 and 420 relative one to another.

More specifically, in the example illustrated in FIGS. 4A-4D, guide members 471 and 472 are positioned relative to bends 441 and 442, respectively, to prevent bends 441 and 442 from straightening. That is, guide member 471 prevents bend 441 from moving past guide member 471 in the −y (negative y) direction and becoming straightened or integrated with bend 442 when electronic device 400 is moved from the extended configuration to the closed configuration. As a specific example, bend 441 comes into contact with guide member 471, and is prevented from continuing in the −y direction. Similarly, guide member 472 prevents bend 442 from moving past guide member 472 in the +y (positive y) direction and becoming straightened of integrated with bend 441 when electronic device 400 is moved from the closed configuration to the extended configuration.

In some implementations, other guide members can be disposed within or at a device including a flexible thermal conductor. For example, a coupling mechanism or coupling members of a device that movably couple body portions of the device can include or define guide members to guide or manage a flexible thermal conductor of or within the device.

Figure 5A:
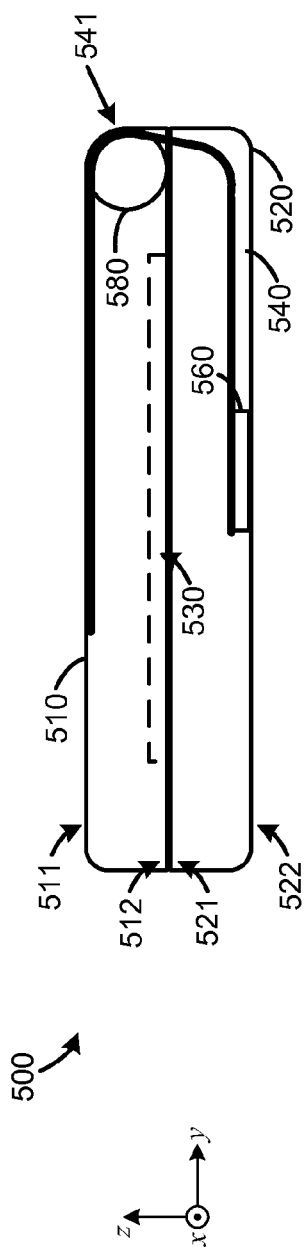
FIGS. 5A and 5B are side perspective views of an electronic device including a flexible thermal conductor, according to another implementation.
Figure 5B:
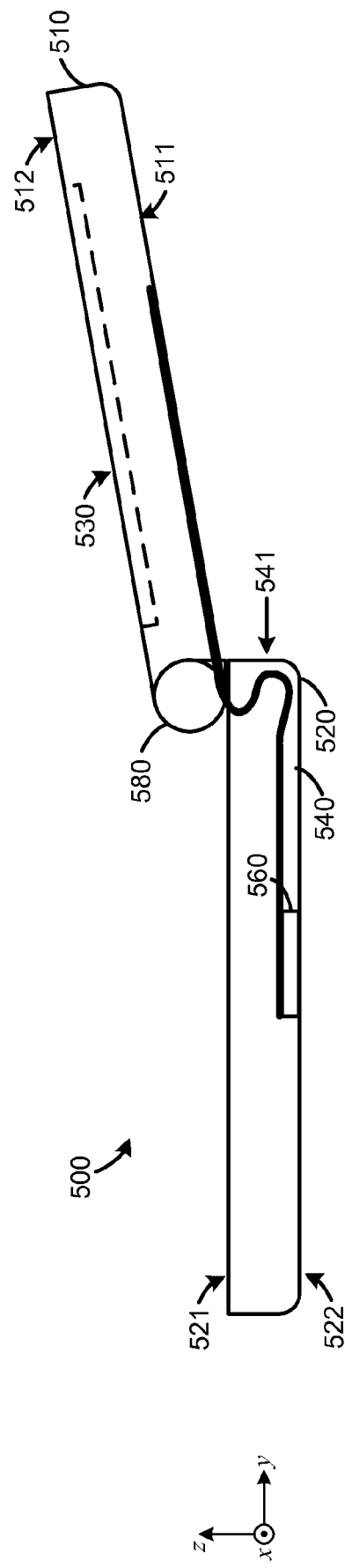

FIGS. 5A and 5B are side perspective views of an electronic device including a flexible thermal conductor, according to another implementation. Electronic device 500 includes body portion 510, body portion 520, face 511, face 512, face 521, face 522, display 530, flexible thermal conductor 540, heat source 560, and coupler 580. FIG. 5A is a side perspective view of electronic device 500 in a closed configuration. That is, face 512 of body portion 510 is substantially aligned with or adjacent to face 521 of body portion 520. FIG. 5B is a side perspective view of electronic device 500 in an extended (or open) configuration. As illustrated in FIG. 5B, face 512 of body portion 510 is not aligned with or adjacent to face 521 of body portion 520

In the example illustrated in FIGS. 5A and 5B, body portions 510 and 520 are rotatably coupled one to another. More specifically, coupler 580 is a hinge mechanism about which body portions 510 and 520 can move relative one to another. Accordingly, electronic device 500 can be converted or moved from the closed configuration to the extended configuration by rotating body portion 510 relative to body portion 520. For example, coupler (hinge mechanism in this example) 580 allows body portions 510 and 520 to move rotationally relative one to another about the x-axis at coupler 580 between the closed configuration and extended configuration, but restrict rotational movement of body portions 510 and 520 relative one to another in bout the y-axis and the z-axis. As a specific example, electronic device 500 can be a flip phone or a PDA, tablet device, slate device, or laptop or notebook computer with, for example, display 530 disposed at one body portion 510 and a keyboard or other input device disposed at body portion 520. Said differently, electronic device 500 can be an electronic device with a clamshell-type body. Furthermore, as body portions 510 and 520 move or rotate relative one to another, flexible portion 541 of flexible thermal conductor 540 flexes or moves to allow movement of body portion 510 and 520 without separation or breakage of flexible thermal conductor 540.

Similar to electronic device 100 illustrated in FIGS. 1A-1E, flexible thermal conductor 540 of electronic device 500 is in thermal communication with heat source 560. Flexible thermal conductor 540 conducts heat from heat source 560 from body portion 520 to body portion 510. Accordingly, flexible thermal conductor 540 is used for thermal management of electronic device 500 when electronic device 500 is in the closed configuration and when electronic device 500 is in the extended configuration.

While certain implementations have been shown and described above, various changes in form and details may be made. For example, some features that have been described in relation to one implementation can be applicable or applied to other implementations. In other words, elements, features, components, and/or properties described in relation to one implementation can be useful in other implementations. As another example, features discussed above in relation to electronic device can be applied to other devices such as optical devices or electro-optical devices in other implementations. Furthermore, it should be understood that the systems and implementations described herein can include various combinations and/or sub-combinations of the elements, components, and/or features of the different implementations described. Thus, features described with reference to one or more implementations described herein can be combined with other implementations.

What is claimed is:

1. An electronic device, comprising:
    a first body portion;
    a second body portion slidably coupled to the first body portion;
    a heat source disposed within the first body portion; and
    a thermal conductor in thermal communication with the heat source and having a first end portion, a second end portion, and a flexible portion between the first end portion and the second end portion,
    the first end portion disposed within the first body portion,
    the second end portion disposed within the second body portion,
    the flexible portion extending from the first body portion to conduct heat into the second body portion.

2. The electronic device of claim 1, wherein the heat source includes at least one of a processor package or a radio frequency power amplifier package.

3. The electronic device of claim 1, wherein the thermal conductor is coupled to a housing of the heat source.

4. The electronic device of claim 1, wherein the thermal conductor includes a plurality of layers.

5. The electronic device of claim 1, wherein the thermal conductor includes a graphite film.

6. The electronic device of claim 1, wherein the thermal conductor defines a plurality of thermal paths.

7. The electronic device of claim 1, wherein the flexible portion defines a first bend and a second bend, the electronic device further comprising:
    a first guide member disposed to prevent straightening of the first bend; and
    a second guide member disposed to prevent straightening of the second bend.

8. An electronic device, comprising:
    a first body portion;
    a second body portion;
    a heat source disposed within one of the first body portion or the second body portion; and
    a thermal conductor in thermal communication with the heat source and comprising a first layer, a second layer, and a third layer that is between the first and second layers, the thermal conductor further having a first end portion, a second end portion, and a flexible portion between the first end portion and the second end portion, wherein
    the first end portion is disposed within the first body portion,
    the second end portion is disposed within the second body portion,
    a portion of the first layer is absent to expose a portion of the third layer in the first end portion or the second end portion proximal to the heat source.

9. The electronic device of claim 8, wherein the heat source includes at least one of a processor package or a radio frequency power amplifier package.

10. The electronic device of claim 8, wherein the thermal conductor is coupled to a housing of the heat source.

11. The electronic device of claim 8, wherein the first layer and the second layer are different from the third layer.

12. The electronic device of claim 8, wherein the third layer comprises a graphite film.

13. The electronic device of claim 12, wherein the first and second layers comprise plastic.

14. The electronic device of claim 8, wherein the second body portion is rotatably coupled to the first body portion about the flexible portion of the thermal conductor.

15. The electronic device of claim 8, wherein the second body portion is slidably coupled to the first body portion.

16. The electronic device of claim 1, wherein the flexible portion extends between the first end portion and the second end portion and includes scores that improve flexing characteristics of the flexible portion.

17. The electronic device of claim 1, wherein the thermal conductor comprises a first layer, a second layer, and a third layer that is between the first and second layers, and a portion of the first layer is absent to expose a portion of the third layer in the first end portion or the second end portion proximal to the heat source.

* * * * *